(12) United States Patent
Ivanisov et al.

(10) Patent No.: US 10,483,315 B2
(45) Date of Patent: Nov. 19, 2019

(54) IMAGE SENSOR CONFIGURED FOR DUAL MODE OPERATION

(71) Applicant: Delta ID, Inc., Fremont, CA (US)

(72) Inventors: Alexander Ivanisov, Newark, CA (US); Salil Prabhakar, Fremont, CA (US)

(73) Assignee: Delta ID, Inc., Fremont, CA (US)

( * ) Notice: Subject to any disclaimer, the term of this patent is extended or adjusted under 35 U.S.C. 154(b) by 0 days.

(21) Appl. No.: 15/780,308

(22) PCT Filed: Dec. 7, 2016

(86) PCT No.: PCT/US2016/065357
§ 371 (c)(1),
(2) Date: May 31, 2018

(87) PCT Pub. No.: WO2017/100309
PCT Pub. Date: Jun. 15, 2017

(65) Prior Publication Data
US 2018/0350866 A1     Dec. 6, 2018

Related U.S. Application Data

(60) Provisional application No. 62/264,065, filed on Dec. 7, 2015.

(51) Int. Cl.
*H01L 27/146*     (2006.01)
*H04N 5/33*     (2006.01)
(Continued)

(52) U.S. Cl.
CPC ........ *H01L 27/14645* (2013.01); *G06F 21/32* (2013.01); *G06K 9/00604* (2013.01);
(Continued)

(58) Field of Classification Search
CPC ........... G06K 9/00604; G06K 9/00885; G06K 9/2018; G06F 21/32; H01L 27/14645
See application file for complete search history.

(56) References Cited

U.S. PATENT DOCUMENTS

| 10,033,928 B1 * | 7/2018 | Meler | H04N 5/2329 |
| 2004/0125222 A1 | 7/2004 | Bradski et al. | |

(Continued)

OTHER PUBLICATIONS

International Search Report and Written Opinion for International Application No. PCT/US2016/065357 dated Feb. 21, 2017, 8 pages.
(Continued)

*Primary Examiner* — Matthew L Reames
(74) *Attorney, Agent, or Firm* — RMCK Law Group, PLC

(57) ABSTRACT

The invention provides apparatuses and methods relevant to image sensors configured for dual mode operation. The invention comprises an image sensor having an image sensor substrate having an array of pixels formed thereon. The array of pixels comprises (i) a first pixel region comprising a first array of pixels, which first array of pixels comprising pixels configured for peak sensitivity to wavelength(s) below 700 nm, and (ii) a second pixel region comprising a second array of pixels, which second array of pixels comprising pixels of a first pixel type and pixels of a second pixel type. Pixels of the first pixel type may be configured for peak sensitivity to wavelength(s) between 700 nm and 1000 nm. Pixels of the second pixel type may be configured for peak sensitivity to wavelength(s) below 700 nm. The invention additionally provides apparatuses incorporating the image sensor and methods for fabricating said image sensor.

8 Claims, 10 Drawing Sheets

(51) Int. Cl.
    *H04N 5/357*     (2011.01)
    *H04N 9/04*     (2006.01)
    *G06K 9/20*     (2006.01)
    *G06F 21/32*     (2013.01)
    *G06K 9/00*     (2006.01)
    *H01L 31/18*     (2006.01)

(52) U.S. Cl.
    CPC ....... *G06K 9/00885* (2013.01); *G06K 9/2018* (2013.01); *H01L 27/14649* (2013.01); *H01L 31/18* (2013.01); *H04N 5/33* (2013.01); *H04N 5/3572* (2013.01); *H04N 9/045* (2013.01); *G06K 9/00597* (2013.01)

(56) References Cited

U.S. PATENT DOCUMENTS

| | | |
|---|---|---|
| 2004/0174446 A1 | 9/2004 | Acharya |
| 2008/0165257 A1 | 7/2008 | Boettiger |
| 2009/0200469 A1 | 8/2009 | Morin et al. |
| 2011/0085063 A1 | 4/2011 | Min et al. |
| 2011/0317018 A1 | 12/2011 | Choe et al. |
| 2012/0189293 A1 | 7/2012 | Cao et al. |
| 2012/0241618 A1 | 9/2012 | Hsu et al. |
| 2012/0249744 A1 | 10/2012 | Pesach et al. |
| 2014/0307077 A1 | 10/2014 | Prabhakar |
| 2015/0001664 A1 | 1/2015 | Tempel et al. |
| 2015/0069218 A1 | 3/2015 | Cho et al. |
| 2015/0163418 A1 | 6/2015 | Chen et al. |
| 2015/0256775 A1 | 9/2015 | Li et al. |
| 2015/0304535 A1 | 10/2015 | Smits et al. |
| 2016/0006913 A1* | 1/2016 | Kettunen ............. H04N 5/2258 348/374 |
| 2016/0181226 A1 | 6/2016 | Wan |
| 2016/0284747 A1* | 9/2016 | Park ................. H01L 27/14645 |

OTHER PUBLICATIONS

Supplementary European Search Report dated May 8, 2019 for EP Application No. 16873758, 2 pages.

* cited by examiner

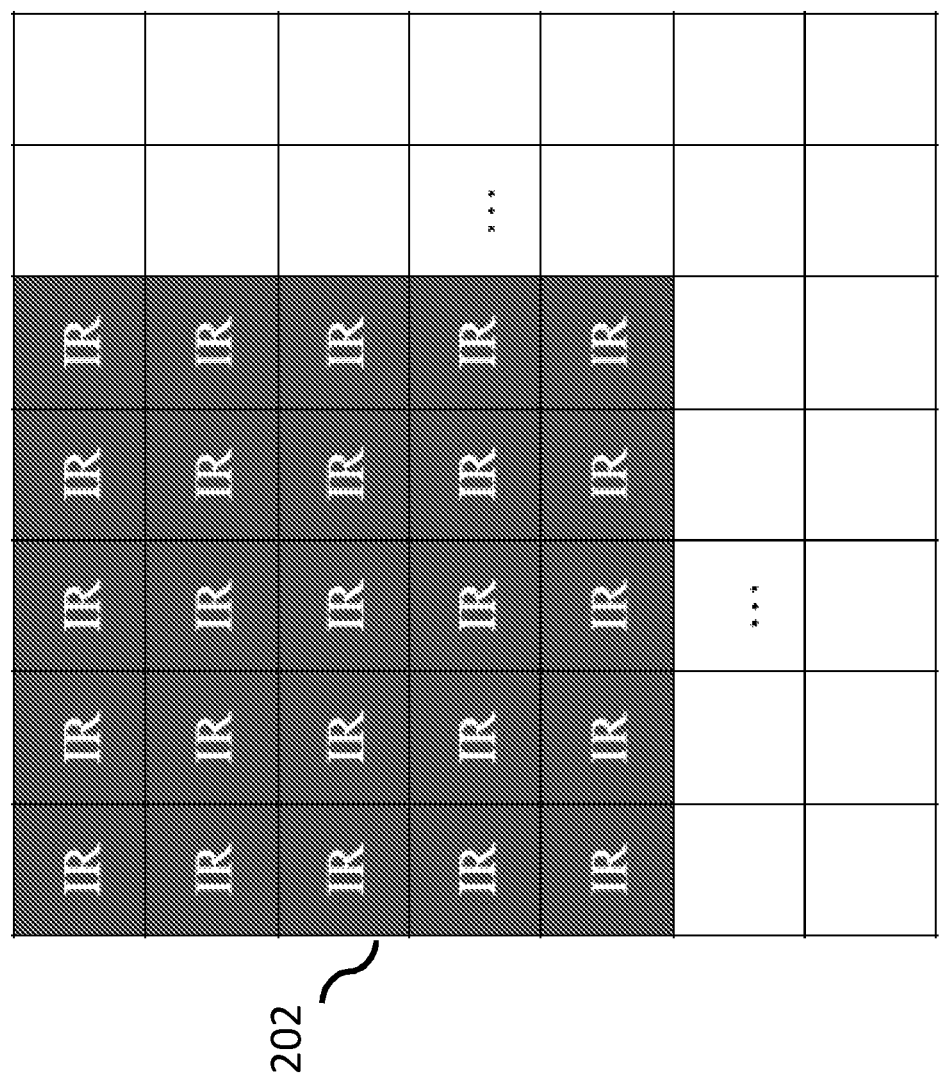

IMAGE SENSOR CONFIGURED FOR DUAL MODE OPERATION

CROSS-REFERENCE TO RELATED APPLICATION

This application claims priority to U.S. Provisional Patent Application No. 62/264,065, filed Dec. 7, 2015, the contents of which are incorporated by reference herein.

FIELD OF THE INVENTION

The present invention relates to technologies for eye based biometric authentication. In particular, the invention provides improvements to apparatuses, methods and computer programs for eye based biometric systems which rely on biometric imaging under infrared or near infrared illumination.

BACKGROUND

Eye based biometric authentication apparatuses rely on acquiring images of a subject's eye under infrared or near infrared illumination.

FIG. 1A illustrates an eye based biometric system 100 comprising an imaging apparatus 102 for acquiring images of a subject's eye coupled with an image processing apparatus 104 for extracting biometric information from acquired images, and optionally analysing such information for the purpose of biometric authentication.

FIG. 1B illustrates an imaging apparatus of the kind more generally illustrated in FIG. 1A, comprising an illuminator IL and imaging camera IC respectively configured such that illuminating radiations from illuminator IL are scattered off a subject's eye E onto imaging camera IC for image acquisition purposes. In embodiments related to eye based biometric authentication (and particularly iris based biometric authentication), illuminator IL emits near infrared wavelengths in the range between 700 nm and 1000 nm.

Since eye based biometric authentication systems rely on infrared or near infrared illumination, image sensors configured to enable such biometric authentication require sensitivity to infrared or near infrared illumination. For the purposes of normal photography on the other hand, infrared or near infrared wavelengths are typically sought to be filtered out. Devices which require to be configured for both normal photography and infrared or near infrared based biometric authentication therefore use two imaging cameras, one configured for infrared or near infrared sensitivity and the other configured for color sensitivity (and infrared or near infrared insensitivity).

The imaging camera configured for infrared or near infrared sensitivity may comprise an image sensor 202 of the kind illustrated in FIG. 2A, having an array of pixels that are sensitive to the desired infrared or near infrared wavelengths. Conventionally, such pixels have also been sensitive to visible wavelengths within the visible spectrums. The imaging camera configured for color sensitivity (and preferably infrared or near infrared insensitivity) may comprise an image sensor 204 of the kind illustrated in FIG. 2B, having a pixel array wherein each pixel is sensitive to one or more wavelengths within the visible spectrum (e.g. red (R), green (G) or blue (B) wavelengths). Each of these pixels may have an infrared or near infrared mask or filter disposed therein, to ensure insensitivity or low sensitivity to infrared or near infrared wavelengths.

FIGS. 2C and 2D illustrate typical prior art RGBIR pixel arrays of the kind used for infrared wavelength based biometric recognition.

In the array 206 shown in FIG. 2C every pixel is sensitive to IR, and is also sensitive one of red (R), blue (B) or green (G) wavelengths. In imaging conditions where the intensity of infrared wavelengths incident upon the image sensor is strong (e.g. outdoors), the infrared wavelengths interfere with accurate reproduction of visible colors in the acquired image. The resolution in the infrared spectrum or near infrared spectrum exhibited by the pixel array of FIG. 2C is good, since every pixel is sensitive to infrared. However, due to the high sensitivity of pixels to infrared wavelengths, the illustrated pixel array has limited effectiveness for visible color imaging outside of a narrow range of ambient light conditions—which limits its effectiveness for eye based recognition to a narrow set of working conditions.

The pixel array 208 illustrated in FIG. 2D addresses the issue of visible color reproduction in environments where ambient infrared wavelengths are strong. However, the image resolution in the infrared wavelength component is reduced to ¼ in comparison with image resolution in the infrared wavelength component exhibited by the pixel array of FIG. 2C. This reduction makes it difficult for the pixel array of FIG. 2D to achieve accurate eye-based biometric recognition within a fixed set of image sensor size and cost constraints.

It is common to use RGB sensors in conjunction with an external infrared cut filter, in order to block infrared light from negatively affecting color reproduction. Similarly it is common to use RGBIR sensors in conjunction with an external dual-band-pass filter, where one band passes visible light and the second passes only the desired portion of the infrared spectrum. It is understood that spectral sensitivity of the pixels refers to sensitivity only to the portion of the radiation spectrum that is not blocked by the external optical filter.

There has additionally been an increasing demand for dual use cameras that can be used for eye based biometric imaging and also for non-biometric imaging purposes (such as regular photography or videography). This need has been particularly felt in the case of mobile communications devices and mobile computing devices, where size, weight and power consumption, place critical limitations on the number of components that can be incorporated within a single device.

There is accordingly a need for technology that advances performance of image sensors having a pixel array that simultaneously includes pixels respectively sensitive to visible wavelengths and pixels sensitive to infrared or near infrared wavelengths.

SUMMARY

The invention provides improvements to apparatuses, methods and computer programs for eye based biometric systems which rely on biometric imaging under infrared or near infrared illumination.

In an embodiment, the invention provides an image sensor comprising an image sensor substrate having an array of pixels formed thereon, said array of pixels comprising: (i) a first pixel region comprising a first array of pixels, said first array of pixels comprising pixels configured for peak sensitivity to wavelength(s) below 700 nm, and (ii) a second pixel region comprising a second array of pixels, said second array of pixels comprising pixels of a first pixel type and pixels of a second pixel type. Pixels of the first pixel type are configured for peak sensitivity to wavelength(s) between 700 nm and 1000 nm. Pixels of the second pixel type are configured for peak sensitivity to wavelength(s) below 700 nm.

In an embodiment of the image sensor, within the second pixel region, a ratio of pixels of the first pixel type to pixels of the second pixel type is between 1:1 and 255:1. Further, within the second pixel region, one or more pixels of the second pixel type may exhibit a different spectral response in comparison with one or more other pixels of the second pixel type.

The second pixel region may comprise a contiguous pixel array of at least 300 pixels. The second pixel region may advantageously comprise a contiguous pixel array of at least 1400×600 pixels.

Within the second pixel region, pixels of the second pixel type may have a lower sensitivity to wavelengths of between 700 nm and 1000 nm, in comparison with pixels of the first pixel type. The first pixel region may exclude pixels having peak sensitivity to wavelength(s) between 700 nm and 1000 nm.

All pixels formed on the image sensor substrate may be formed within any of the first pixel region or the second pixel region.

In an embodiment of the image sensor, a total number of pixels within the first pixel region is greater than a total number of pixels within the second pixel region.

In another embodiment, an average distance of pixels within the second pixel region from a centre of the image sensor may be less than an average distance of pixels within the first pixel region from the centre of the image sensor.

The invention additionally provides an imaging apparatus configured for dual mode operation. The imaging apparatus comprises: (i) an image sensor substrate having an array of pixels formed thereon, said array of pixels comprising: (a) a first pixel region comprising a first array of pixels, said first array of pixels comprising pixels configured for peak sensitivity to wavelength(s) below 700 nm, and (b) a second pixel region comprising a second array of pixels, said second array of pixels comprising pixels of a first pixel type and pixels of a second pixel type, wherein pixels of the first pixel type are configured for peak sensitivity to wavelength(s) between 700 nm and 1000 nm, and pixels of the second pixel type are configured for peak sensitivity to wavelength(s) below 700 nm. An optical assembly may be interposed between the image sensor and an intersection region defined by an intersection of a depth of field region and a field of view region of the imaging apparatus, wherein the optical assembly may be configured such that an image of an object positioned within said intersection region exhibits barrel distortion or moustache distortion.

The imaging apparatus may further comprise a processor configured to: (i) receive an image from the image sensor, and (ii) process the received image to at least partially compensate for geometrical distortion of the optical assembly.

The invention additionally comprises a method of fabricating an image sensor for an imaging apparatus configured for dual mode operation, the method comprising defining for an image sensor substrate (i) a first pixel region comprising a first array of pixels, said first array of pixels comprising pixels configured for peak sensitivity to wavelength(s) below 700 nm, and (ii) a second pixel region comprising a second array of pixels, said second array of pixels comprising pixels of a first pixel type and pixels of a second pixel type. Pixels of the first pixel type may be configured for peak sensitivity to wavelength(s) between 700 nm and 1000 nm. Pixels of the second pixel type may be configured for peak sensitivity to wavelength(s) below 700 nm. The method may comprise forming the first pixel region and the second pixel region on the image sensor substrate.

BRIEF DESCRIPTION OF THE ACCOMPANYING DRAWINGS

FIGS. 2A to 2F and 3 illustrate pixel arrays within image sensors capable of implementation for the purposes of eye based biometric recognition.

DETAILED DESCRIPTION OF THE INVENTION

The present invention provides an advanced image sensor intended inter alia for dual use cameras that are capable of being configured for eye based biometric authentication (which relies on infrared or near infrared wavelengths) as well as for non-biometric authentication purposes, such as ordinary photography or videography (which relies on visible wavelengths).

Dual use cameras within mobile communication devices are typically implemented as front facing cameras (i.e. a camera on the display side of the device)—which can be used for biometric authentication as well as for visible light photography or videography. Implementation of eye based biometric recognition requires image sensors having a higher pixel resolution (number of pixels per mm within the eye image acquired by the image sensor), as compared to visible light based imaging applications, which use the front facing camera (e.g. video chat, etc.). At the same time, the visible light imaging applications for the front facing camera typically require a wider field of view, as compared to iris recognition.

Figure 1A:
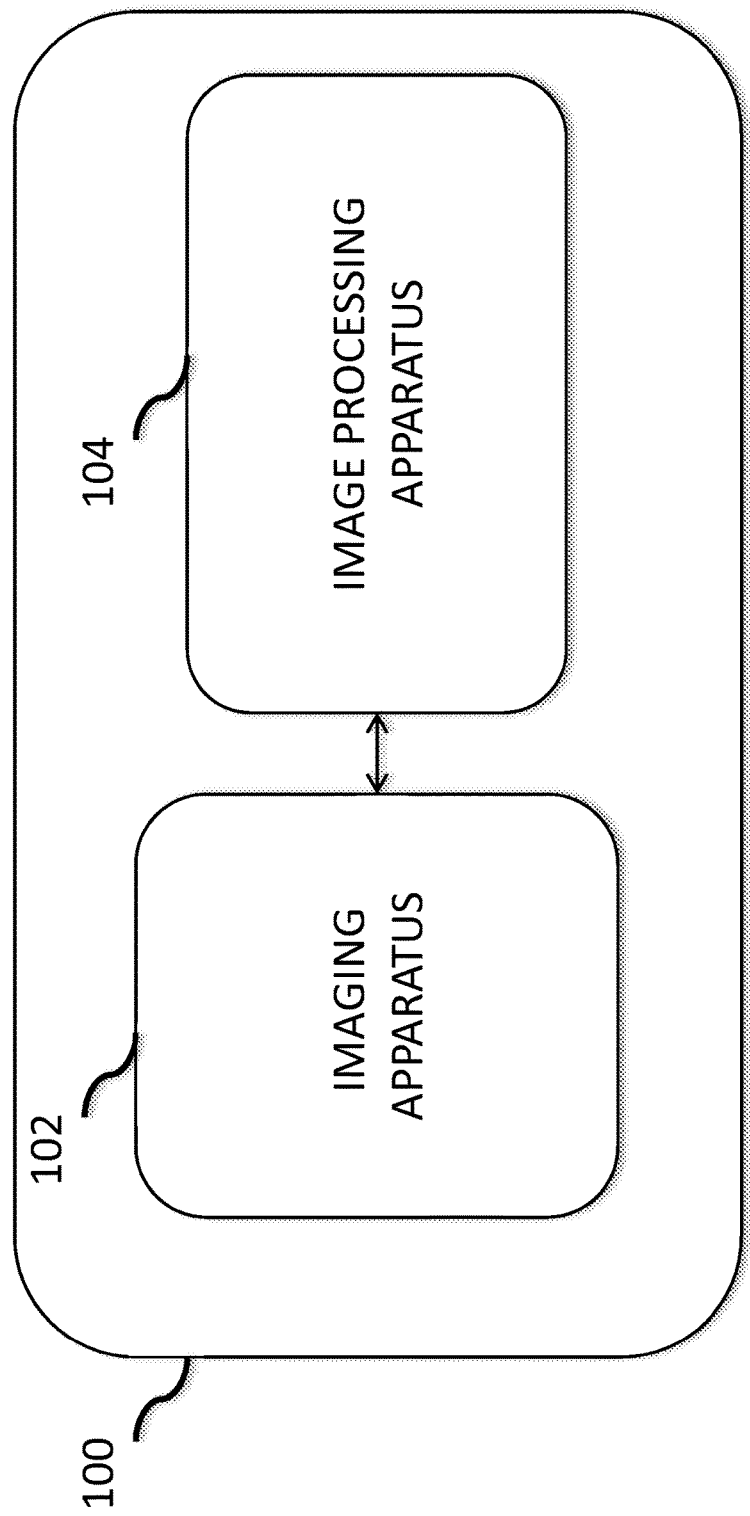
FIGS. 1A and 1B illustrate conventional biometric authentication apparatuses.
Figure 1B:
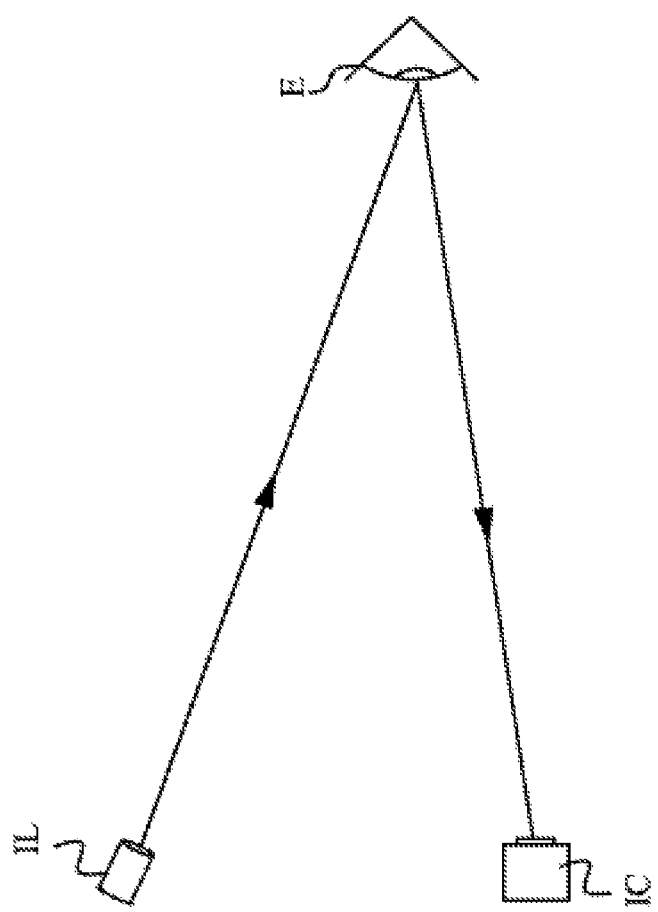
Figure 2B:
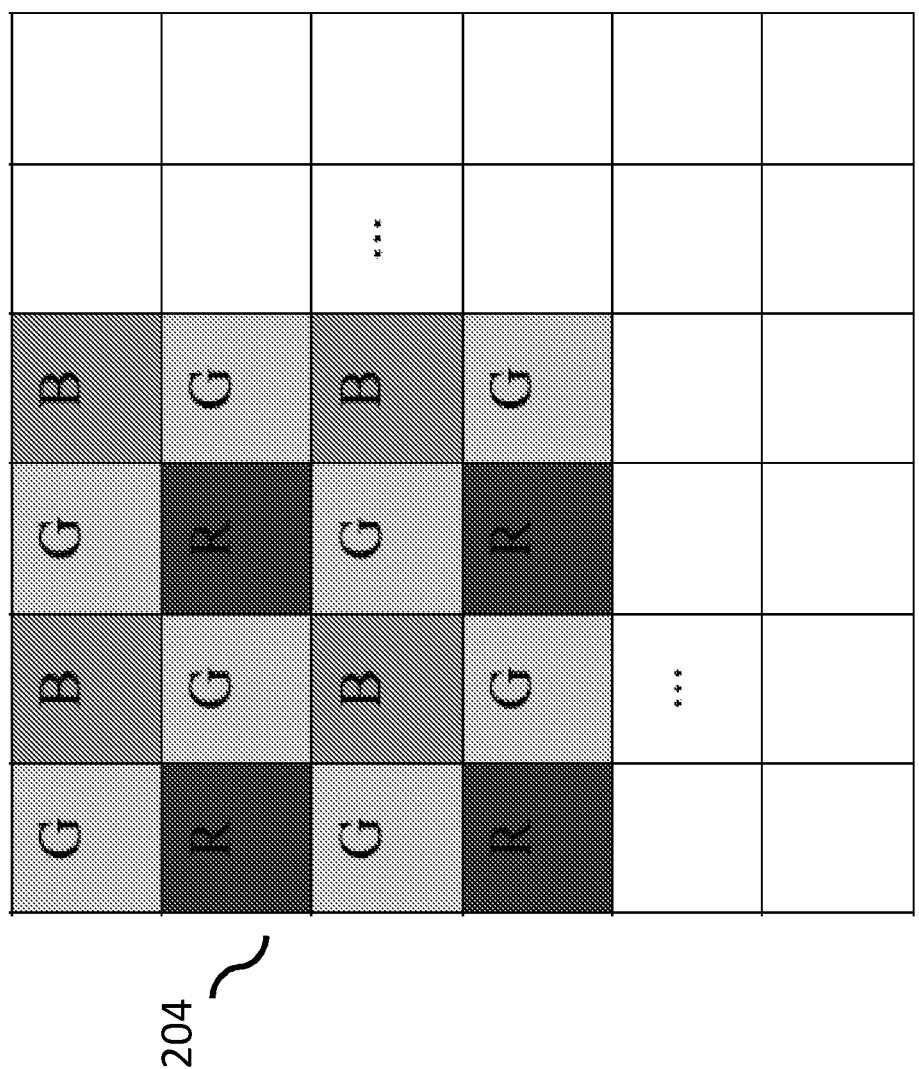
Figure 2C:
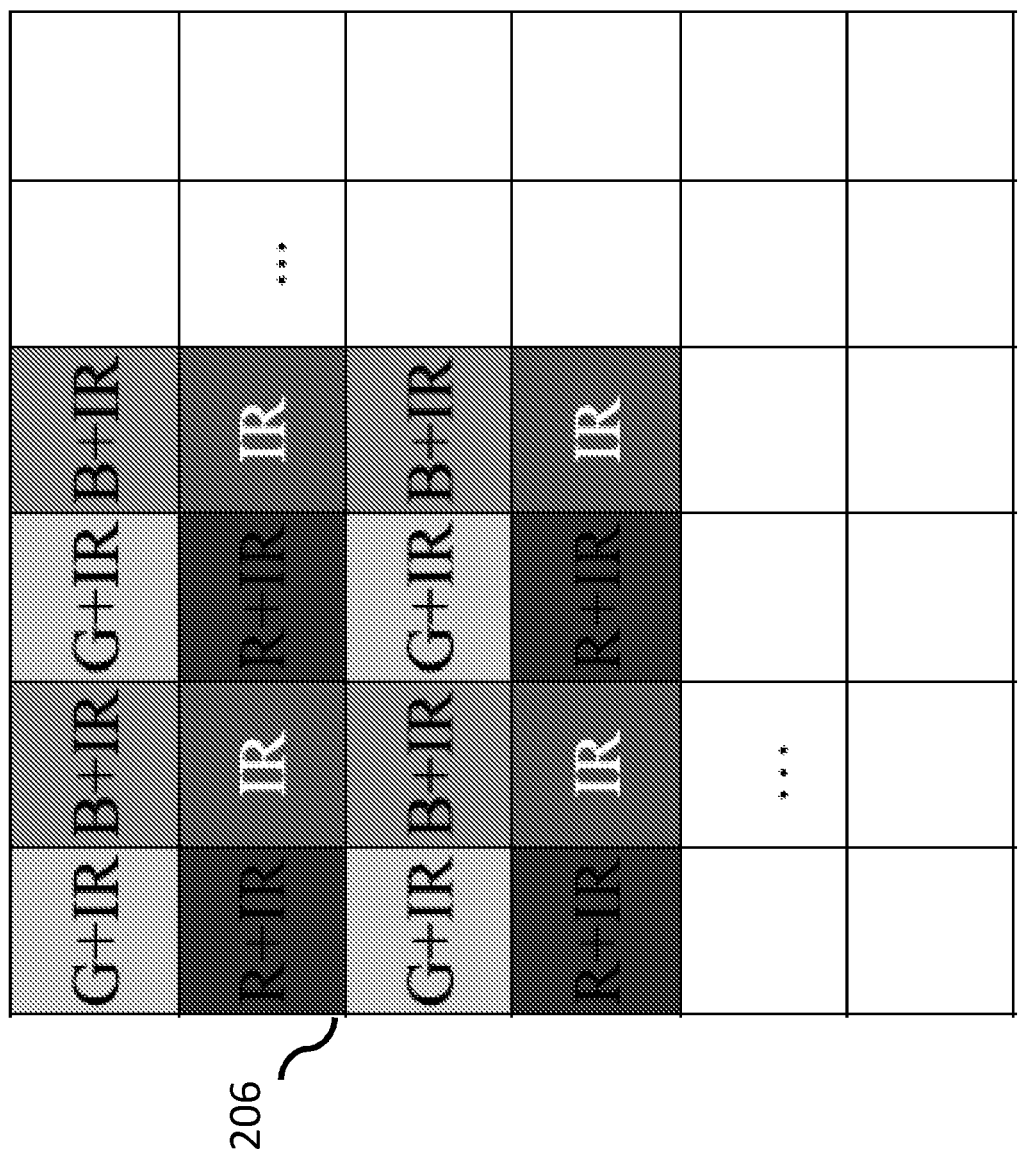
Figure 2D:
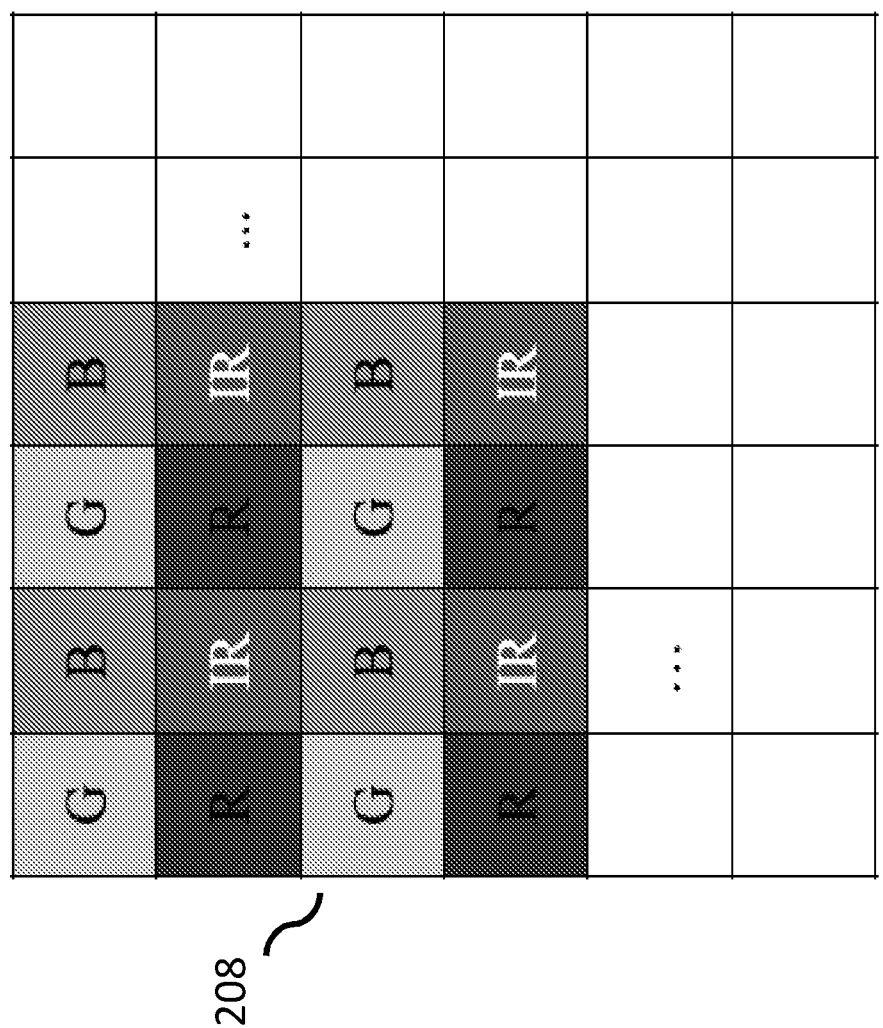
Figure 2E:
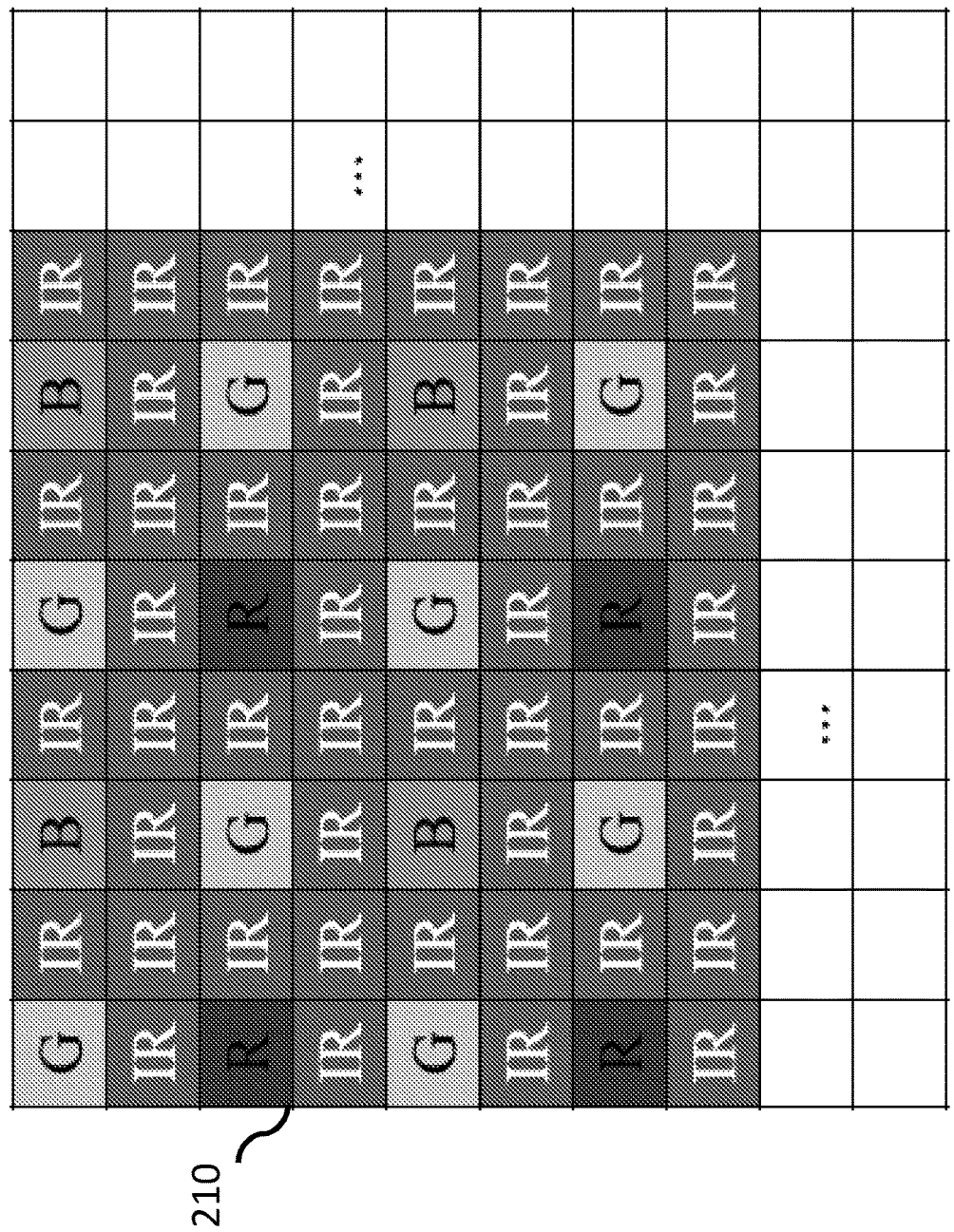
Figure 2F:
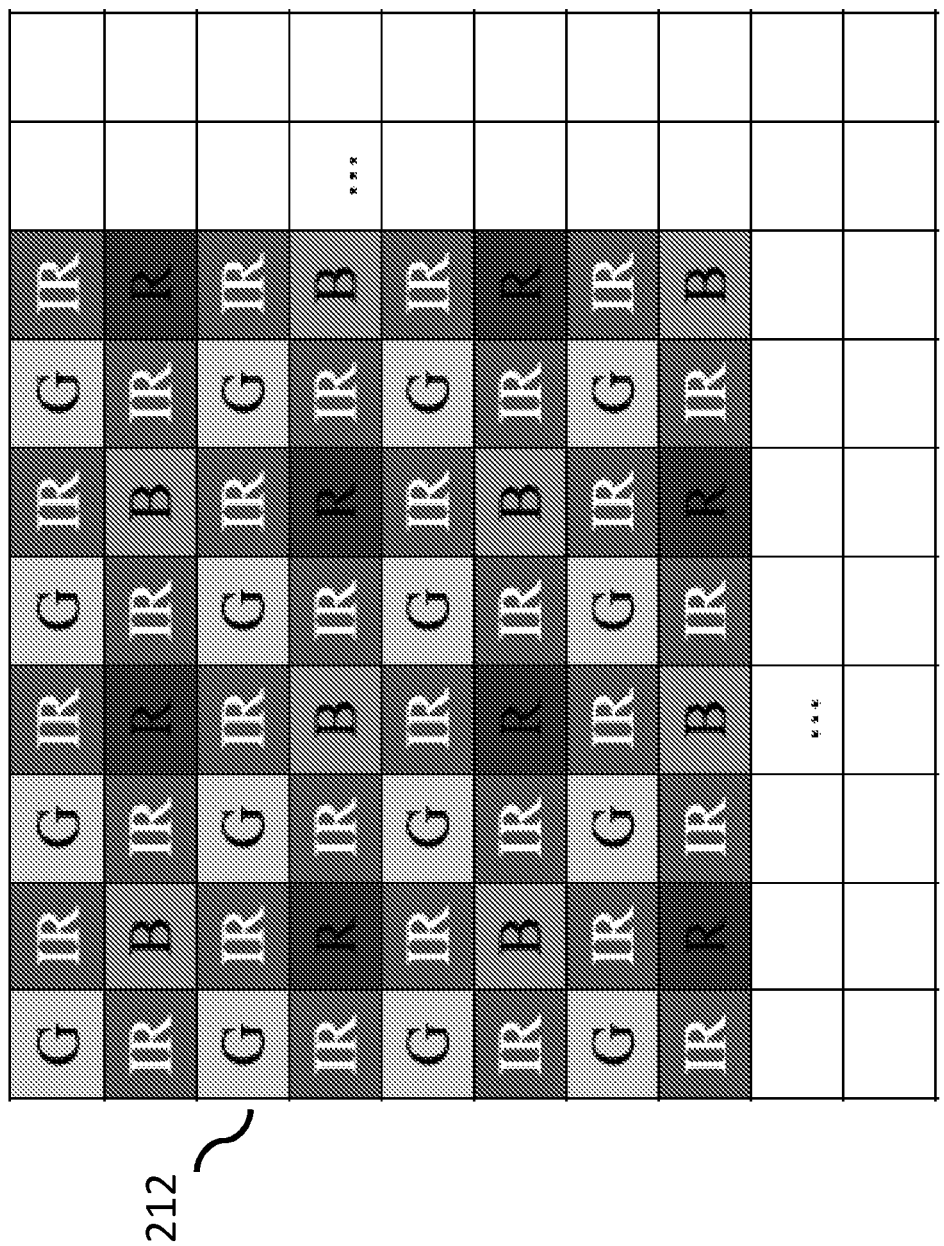

To achieve the desired dual use, new types of imaging sensors 210, 212 respectively of the type illustrated in FIGS. 2E and 2F have been developed.

As will be observed, the image sensor 210, 210 of FIGS. 2E and 2F respectively comprise pixels that are sensitive to the desired infrared or near infrared wavelengths (IR pixels) and also include pixels sensitive to visible wavelengths (e.g. red (R), green (G) or blue (B) wavelengths), where the pixel density of IR pixels is the same (for example as in FIG. 2F) or higher (for example as in FIG. 2E) than the pixel density of pixels sensitive to visible light. Each of these visible wavelength sensitive pixels may have an infrared or near infrared mask or filter disposed therein, to ensure insensitivity or low sensitivity to infrared or near infrared wavelengths. Additionally developments in technology has ensured that the IR pixels within the image sensor are either insensitive to or have reduced sensitivity (in comparison with earlier IR pixel technology) to visible wavelengths.

Figure 3:
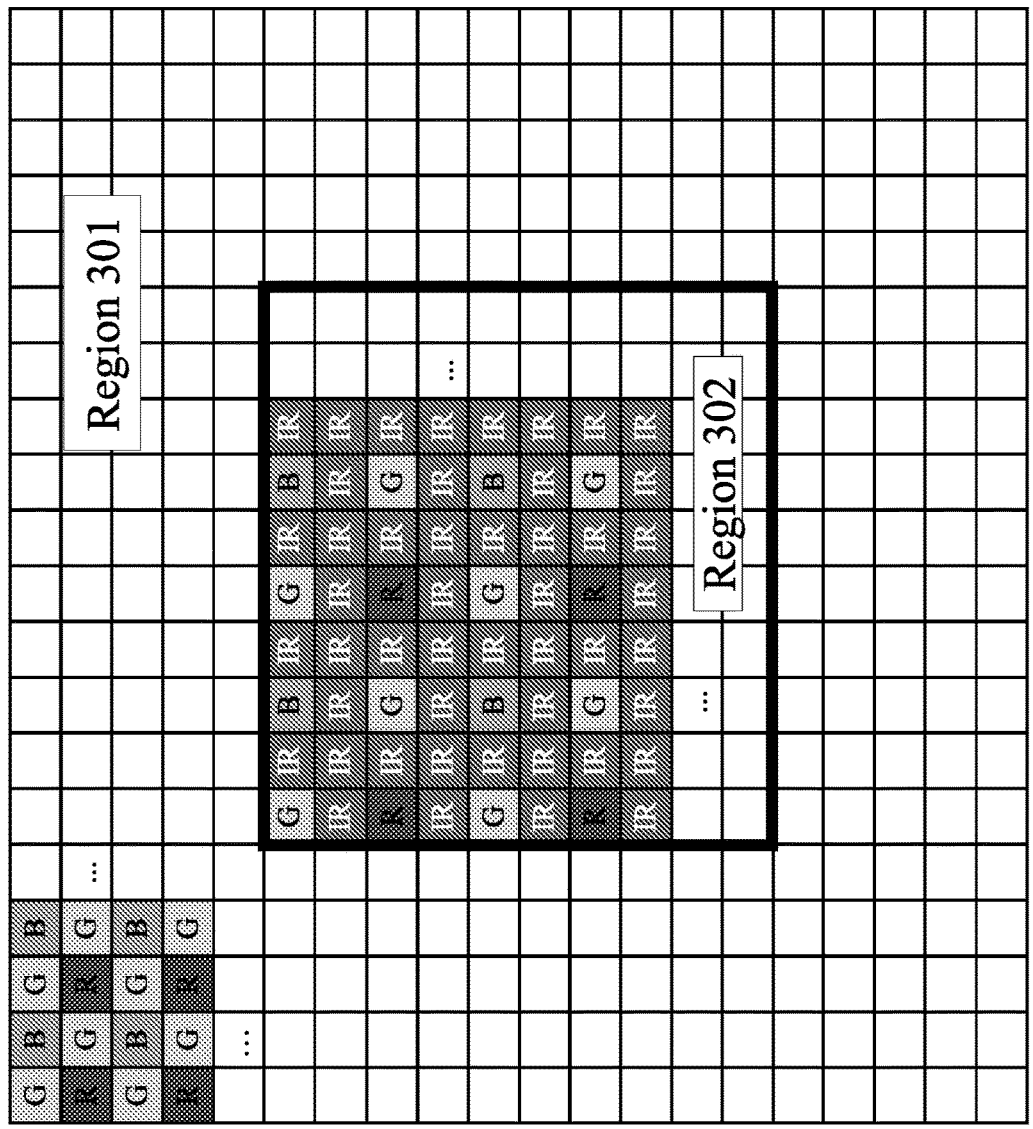

FIG. 3 illustrates an image sensor in accordance with the teachings of the present invention. The image sensor comprises an array of pixels comprising at least a first pixel region 301 and a second pixel region 302. The first pixel region 301 comprises an array of pixels wherein pixels within said array of pixels are sensitive to visible wavelengths and preferably have a peak sensitivity corresponding to wavelength(s) below 700 nm. In the embodiment illustrated in FIG. 3, first pixel region 301 includes an array of pixels that are respectively sensitive to wavelengths within visible spectrum, for example the pixels with peak sensitivity in the red (R), green (G) or blue (B) spectrums. While first pixel region 301 has been illustrated as including an RGB array, it would be understood that the first pixel region 301 may comprise any other color array configuration, including for example, RGB, RGBW, RGBE, CYYM or CYGM or multiple different sets of color array configurations. Due to the configuration of first pixel region 301, said first pixel region may be used for visible wavelength based image acquisition.

Second pixel region 302 of the image sensor comprises an array of pixels of the type previously illustrated in FIGS. 2E and 2F, comprising a combination of pixels that are sensitive to the desired infrared or near infrared wavelengths (IR pixels) and also pixels sensitive to visible wavelengths (e.g. red (R), green (G) or blue (B) wavelengths). Due to the configuration of second pixel region 302, said second pixel region may be used for infrared or near infrared wavelength based image acquisition.

In an embodiment of the invention, the second set of pixel regions comprises (i) a first pixel type that is sensitive to wavelengths of at least between 700 nm and 1000 nm, and preferably having a peak sensitivity corresponding to wavelength(s) between 700 nm and 1000 nm spectrum, and (ii) a second pixel type that is sensitive to wavelengths below 700 nm (preferably having a peak sensitivity corresponding to wavelength(s) below 700 nm), and which has a reduced (preferably significantly reduced) sensitivity to wavelengths of between 700 nm and 1000 nm in comparison with the first pixel type. The ratio of pixels of the first pixel type to pixels of the second pixel type, within the second set of pixel regions, may lie between 1:1 and 255:1, preferably between 1:1 and 15:1, and more preferably 3:1.

For the purposes of the invention, pixels of the second pixel type may have identical or different spectral responses in comparison to each other—provided they all demonstrate sensitivity in at least part of the visible spectrum. While such pixels may demonstrate varying sensitivity to wavelengths between 700 nm and 1000 nm, it is preferred that such sensitivity be less than the sensitivity demonstrated by pixels of the first pixel type in respect of wavelengths between 700 nm and 1000 nm. In a more preferred embodiment, pixels of the second pixel type are not sensitive or are possessed of insignificant sensitivity to wavelengths between 700 nm and 1000 nm.

In a preferred embodiment, the sensitivity of pixels of the first pixel type to wavelengths below 700 nm is low (and preferably insignificant), and in a yet more preferred embodiment, pixels of the second pixel type have low (and preferably insignificant) sensitivity to visible wavelengths that are permitted to pass by a band-pass filter interposed between the image sensor and an intended image capture region.

In an embodiment of the invention, the second set of pixel regions comprises a contiguous pixel array of at least 300 pixels and more preferably a contiguous pixel array of at least 1000 pixels. The second set of pixel regions may in another embodiment comprise a contiguous pixel array of at least 1400×600 pixels, preferably at least 1920×1080 pixels, more preferably at least 1920×1200 pixels and yet more preferably at least 2000×2000 pixels.

In an embodiment of the invention, the pixels within the first set of pixel regions (i) comprises pixels of the second pixel type i.e. pixels that are sensitive to wavelengths below 700 nm (preferably having a peak sensitivity corresponding to wavelength(s) below 700 nm), and which have a reduced sensitivity to wavelengths of between 700 nm and 1000 nm in comparison with pixels of the first pixel type, and (ii) do not include pixels of the first pixel type.

In a specific embodiment of the invention, each pixel within the image sensor falls within either the first set of pixel regions or the second set of pixel regions.

In a particular embodiment, the total number of pixels within the first set of pixel regions is greater than the total number of pixels within the second set of pixel regions.

In an embodiment of the invention, the second set of pixel regions is located at and around the centre of the image sensor, while the first set of pixel regions is located at or around the peripheral regions of the image sensor. In an embodiment of the invention, the average distance of pixels within the second set of pixel regions from the centre of the image sensor is less than the average distance of pixels within the first set of pixel regions from the centre of the image sensor.

In an embodiment of the invention, an optical assembly interposed between the image sensor of the present invention and an intended image capture region is configured to achieve barrel distortion or moustache distortion of an imaged object (or part of an imaged object)—i.e. an object imaged when positioned within a region where the depth of field (DoF) of the optical assembly intersects the field of view (FoV) of the optical assembly. It has been surprisingly discovered, that in embodiments of the invention, where the second set of pixel regions is located at and around the centre of the image sensor, barrel or moustache distortion improves resolution in the central region and improves the field of view capable of being imaged by the second set of pixel regions.

In an embodiment of the invention, the image sensor comprising the first and second set of pixel regions may comprise an image sensor having resolution of at least 8 megapixels.

In a specific embodiment of the invention, image information extracted from pixels within the first set of pixel regions and second set of pixel regions in an image frame may be used for the purpose of biometric authentication based on facial features, while image information received from pixels within the second set of pixel regions within the same image frame is used for the purpose of eye based or iris based biometric authentication. In another embodiment, image information extracted from pixels within the first set of pixel regions and second set of pixel regions in an image frame may be used for the purpose of biometric authentication based on facial features, while image information received from pixels within the second set of pixel regions within the same image frame may be used for eye or iris based spoof detection (i.e. determining whether the face or facial features presented from biometric authentication are real or fake).

In another embodiment of the invention, information from the different color components of the pixel array may be used to implement multi-spectral spoof detection techniques, including, but not limited to enrolling and comparing iris, periocular and facial spectral information features. Sufficient degree of similarity of detected spectral features enables the conclusion that an imaged eye or face is a real eye or face. In another embodiment, spectral features that are characteristic of known types of spoofing techniques may be used to determine whether an eye or face that is presented for imaging and authentication real or fake.

The invention additionally provides a method and computer program product, wherein the imaging apparatus selectively parses and processes (i) image data from pixels within the second set of pixel regions for eye based biometric authentication purposes, or for such other purposes that rely on image acquisition using wavelengths between 700 nm and 1000 nm and (ii) image data from pixels within the first set of pixel regions for purposes that do not rely on wavelengths within the infrared or near infrared spectrum (such as routine or non-biometric photography or videography).

The apparatus of the present invention may be triggered to parse image data from pixels within the first set of pixel regions or from the second set of image regions depending on the image capture objective. In an embodiment of the invention, the apparatus is triggered to parse image data from the second set of pixel regions, in response to an instruction for acquiring an image for biometric authentication. The apparatus may be triggered to parse image data from the first set of pixel regions, in response to an instruction for acquiring an image for non-biometric purposes.

In an embodiment of the invention image data from at least the infrared pixels may be used for the biometric authentication, while image data from pixels sensitive to the visible spectrum from the same image frame may be used for photography or videography or displayed to a user or operator.

In an embodiment, the invention provides an image sensor which may comprise a first set of pixels that are sensitive to a set of infrared or near infrared wavelengths and a second set of pixels that are sensitive to one or more visible wavelengths. Pixel density of the first set of pixels is equal to or higher than pixel density of the second set of pixels.

In another embodiment, an image sensor may comprise a first set of pixels that are sensitive to a set of infrared or near infrared wavelengths and a second set of pixels that are sensitive to one or more visible wavelengths. The image sensor may additionally comprise at least a first region and a second region. In the first region, pixel density of pixels within the first set of pixels is equal to or higher than pixel density of pixels within the second set of pixels.

The first region of the image sensor may be located substantially in the center of a pixel array forming the image sensor. The invention may additionally include, an imaging apparatus comprising said image sensor, wherein the image sensor may be used in conjunction with an optical lens or optical assembly exhibiting barrel or moustache type geometrical distortion.

In another embodiment, the invention comprises an image processing apparatus configured to receive an image from an imaging apparatus comprising the image sensor and an optical lens or optical assembly exhibiting barrel or moustache type geometrical distortion. In this embodiment, geometrical distortion caused by the optical lens or optical assembly may be at least partially compensated for, during image processing.

The invention additionally provides methods for fabricating a dual use image sensor—which dual use includes biometric authentication as well as visible light photography or videography. In an embodiment, the method of fabricating the dual use image sensor comprises defining an array of pixels for formation on an image sensor substrate, said array of pixels comprising at least a first pixel region and a second pixel region, and forming an image sensor comprising the first pixel region and the second pixel region. Defining the first pixel region comprises defining on an image sensor substrate, an array of pixels that are sensitive to visible wavelengths (for example the first pixel region 301 illustrated and described in connection with FIG. 3). Defining the second pixel region (for example the second pixel region 302 illustrated and described in connection with FIG. 3) comprises defining on the image sensor substrate, an array of pixels of the type previously illustrated in FIGS. 2E and 2F, comprising a combination of pixels that are sensitive to the desired infrared or near infrared wavelengths (IR pixels) and also pixels sensitive to visible wavelengths (e.g. red (R), green (G) or blue (B) wavelengths). The first and second regions of pixels may be defined and formed such that said regions of pixels have one or more properties previously described in connection with the first pixel region 301 and the second pixel region 302 of FIG. 3.

In addition to the above described apparatuses and methods, the invention additionally provides computer program products configured for implementing the methods of the present invention.

A computer program product in accordance with the present invention may comprise computer readable instructions stored on a transitory or non-transitory computer readable medium, and may include instructions for implementing one or more methods in accordance with the teachings of the present invention.

Figure 4:
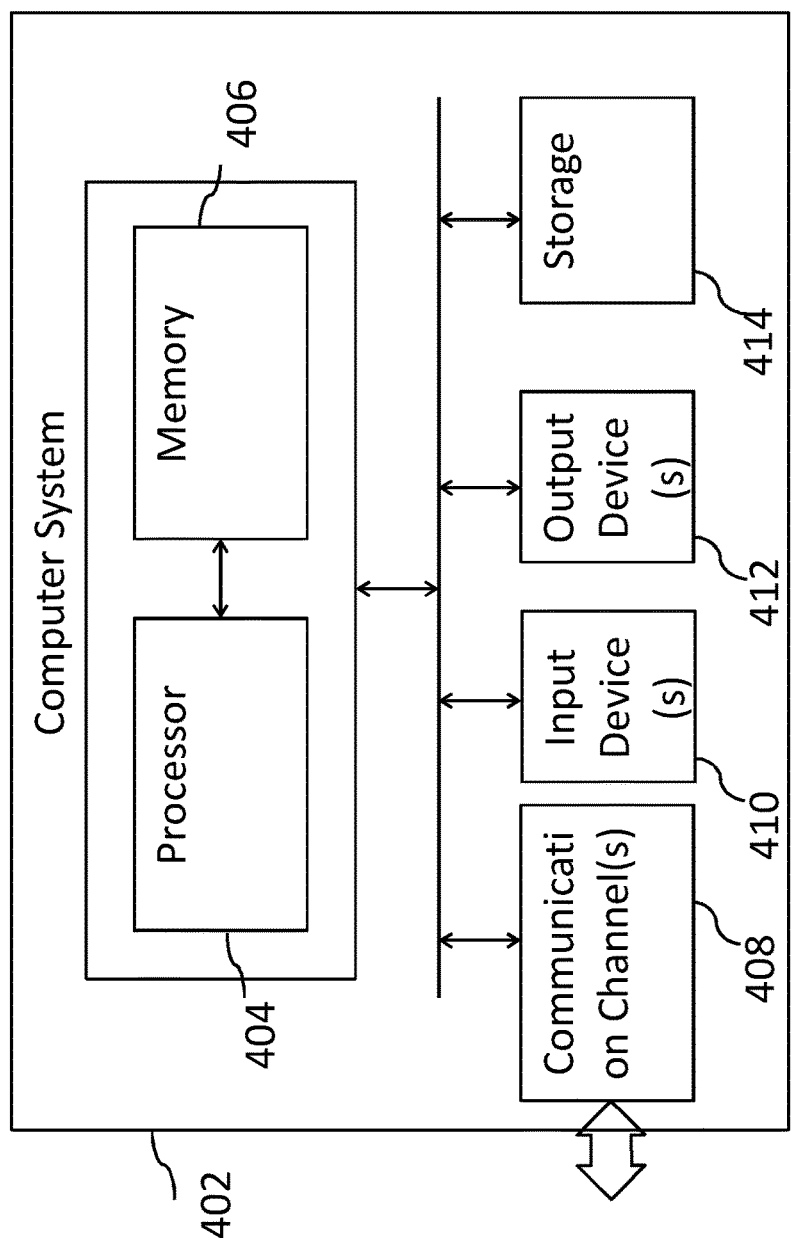
FIG. 4 illustrates an exemplary computing environment for implementing the present invention.

FIG. 4 illustrates an exemplary computing system for implementing the present invention.

The computing system 402 comprises one or more processors 404 and at least one memory 406. Processor 404 is configured to execute program instructions—and may be a real processor or a virtual processor. It will be understood that computer system 402 does not suggest any limitation as to scope of use or functionality of described embodiments. The computer system 402 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 402 in accordance with the present invention may include one or more servers, desktops, laptops, tablets, smart phones, mobile phones, mobile communication devices, tablets, phablets and personal digital assistants. In an embodiment of the present invention, the memory 406 may store software for implementing various embodiments of the present invention. The computer system 402 may have additional components. For example, the computer system 402 may include one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402 using a processor 404, and manages different functionalities of the components of the computer system 402.

The communication channel(s) 408 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 410 may include, but is not limited to, a touch screen, a keyboard, mouse, pen, joystick, trackball, a voice device, a scanning device, or any another device that is capable of providing input to the computer system 402. In an embodiment of the present invention, the input device(s) 1010 may be a sound card or similar device that accepts audio input in analog or digital form. The output device(s)

412 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 402.

The storage 414 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 414 may contain program instructions for implementing any of the described embodiments.

In an embodiment of the present invention, the computer system 402 is part of a distributed network or a part of a set of available cloud resources.

Embodiments of the present invention may be implemented in numerous ways including as a system, a method, or a computer program product such as a computer readable storage medium or a computer network wherein programming instructions are communicated from a remote location.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

It would be understood that the above systems, methods and computer programs may be implemented in any number of ways. The methods, apparatuses and computer programs discussed herein are merely exemplary and are not intended to be understood as being limiting.

The invention claimed is:

1. An image sensor comprising an image sensor substrate having an array of pixels formed thereon, said array of pixels comprising:
    a first pixel region comprising a contiguous first array of pixels, said first array of pixels comprising only pixels configured for peak sensitivity to wavelength(s) below 700 nm;
    and
    a second pixel region comprising a contiguous second array of pixels of at least 300 pixels, said second array of pixels comprising pixels of a first pixel type and pixels of a second pixel type, wherein
        pixels of the first pixel type are configured for peak sensitivity to wavelength(s) between 700 nm and 1000 nm; and
        pixels of the second pixel type are configured for peak sensitivity to wavelength(s) below 700 nm,
    wherein the first pixel region surrounds the second pixel region such that an average distance of pixels within the second pixel region from a center of the image sensor is less than an average distance of pixels within the first pixel region from the center of the image sensor.

2. The image sensor as claimed in claim 1, wherein within the second pixel region, a ratio of pixels of the first pixel type to pixels of the second pixel type is between 1:1 and 255:1.

3. The image sensor as claimed in claim 1, wherein within the second pixel region, one or more pixels of the second pixel type exhibit a different spectral response in comparison with one or more other pixels of the second pixel type.

4. The image sensor as claimed in claim 1, wherein the second pixel region comprises a contiguous pixel array of at least 1400×600 pixels.

5. The image sensor as claimed in claim 1, wherein within the second pixel region, pixels of the second pixel type have a lower sensitivity to wavelengths of between 700 nm and 1000 nm, in comparison with pixels of the first pixel type.

6. The image sensor as claimed in claim 1, wherein all pixels formed on the image sensor substrate are formed within any of the first pixel region or the second pixel region.

7. The image sensor as claimed in claim 1, wherein a total number of pixels within the first pixel region is greater than a total number of pixels within the second pixel region.

8. An imaging apparatus configured for dual mode operation, the imaging apparatus comprising an image sensor according to claim 1.

* * * * *